Patented Oct. 26, 1943

2,332,521

UNITED STATES PATENT OFFICE 2,332,521

ANTIGENIC COMPOSITION

Peter Masucci, Norwood, Pa., assignor to Sharp & Dohme, Incorporated, Philadelphia, Pa., a corporation of Maryland No Drawing. Application June 2, 1939,
Serial No. 276,971

12 Claims. (Cl. 167—78)

This invention is concerned with antigenic compositions and with the preparation and use thereof, and more particularly with such compositions in which antigens are incorporated in a hydrophilic colloid, such as a completely colloidal or substantially completely colloidal clay of the class known as bentonites, dispersed in an aqueous medium. This invention is also concerned with the immunization of living beings, particularly animals, with said antigenic compositions.

In the immunization of living beings, e. g. animals, for the prevention of diseases, or in the hyperimmunization of animals for the purpose of producing hyperimmune sera, it has been the custom to give the animal repeated injections of the particular antigen at various intervals of time, in order to produce a given concentration of the desired antibody in the blood stream of the animal. In this practice considerable labor is involved in giving the particular number of injections to obtain the antibody concentration sought, and considerable expense is incurred by the fact that there is not obtained the full effectiveness possible from the amount of antigenic substance injected with each dose.

In inoculating living beings with an antigen, it has been a common experience that the said living beings were caused considerable distress by undesirable reaction at the site of inoculation either as a result of the volume of material injected or the composition thereof, or both.

It is, therefore, an object of this invention to produce antigenic compositions which are more effective and less distressing in the production of antibodies in animals by making it possible to obtain a higher concentration of antibody in a shorter time with a reduced number of injections and with a lesser amount of antigen required to obtain the desired result.

Another object of the invention is to produce antigenic compositions suitable to bring about a high degree of immunization in man or animal by the injection of a small dose of the antigen without distressing reactions and effective over a long period.

A further feature of the invention is the preparation of antigenic compositions which retard the release of the antigenic substance from the site of inoculation thereby controlling the rate of absorption of the antigen by the tissues of the animal, so that greater effectiveness can result from the entire amount of material injected.

Still another feature of the invention is the production of antigenic compositions which upon injection into living beings slowly release the antigenic substance over an extended period of time so that a single small injection is equivalent in effect to a larger, or more than one, injection of the type heretofore used for immunization and so that a smaller number of smaller doses in a series is more effective in antibody production in producer-animals than the number of doses of a composition of the type heretofore employed.

In general a composition of the type embraced by the invention comprises an antigenic substance incorporated into a suitable amount of a hydrophilic colloid such as a bentonite-like-behaving clay, suspended in a suitable medium.

The antigenic substances which may be employed for the preparation of these compositions include bacterial vaccines (living or dead), toxins, toxoids, viruses, attenuated viruses, bacterial vaccines containing toxins or toxoids, bacterial filtrates, mixtures of any of the above, and materials of like nature.

In the preparation of these compositions a suitable quantity of the desired antigenic substance is added to a previously prepared aqueous suspension of the bentonite-like-behaving clay, such as bentonite, to produce an ultimate composition containing the desired concentration of the hydrophilic colloid.

The nature of the invention is illustrated by, but not restricted to, the following examples.

*Example 1*

A 5% aqueous dispersion of bentonite is prepared and sterilized either by heat or by chemical means, and preferably by the addition of one-half (½%) percent of formalin. To 200 cc. of the 5% aqueous dispersion of bentonite there is added 1000 cc. of a diphtheria toxoid containing 30 flocculation units per cc. The mixture is vigorously shaken until a stable homogeneous suspension is formed. Such a suspension contains approximately 0.83% by weight of bentonite. It is stable and has adequate fluidity to readily pass through the common hypodermic needle.

This toxoid-bentonite suspension is unusually more effective in antitoxin stimulation than is the plain toxoid alone. It has been found that when 1.0 cc. of the plain toxoid alone is injected into guinea pigs, after four weeks it has produced 0.25 unit of diphtheria antitoxin per cc. in the animals' blood serum. On the other hand, 1.0 cc. of the toxoid-bentonite suspension above described injected into the guinea pigs produces in the animals, after four weeks, more than 2.0 units of diphtheria antitoxin per cc. of blood serum.

The compositions of this invention as illustrated by this example can be used to hyperimmunize horses for the production of various antitoxins such as diphtheria, scarlet fever, tetanus, gas gangrene, botulinus, dysentery and antivenoms.

*Example 2*

To 1000 cc. of a whole bacterial culture type of antigen, such as blackleg whole culture (*B. chauvoei*) which has passed a satisfactory purity and sterility test, there are added 200 cc. of a sterile 5% aqueous dispersion of bentonite, the mixture is thoroughly shaken, yielding a stable suspension containing 0.83% of bentonite and of sufficient fluidity to pass through the usual hypodermic needle. Sheep immunized with this composition developed a high grade of immunity to *B. chauvoei*.

In addition to blackleg whole culture, the invention is similarly applicable to other whole bacterial culture type antigens such as anthrax whole culture and hemorrhagic septicemia whole culture and the like. The term, whole bacterial culture type antigen, includes any toxin containing bacterial culture vaccine or any toxoid containing bacterial culture vaccine, or mixtures of the same. The toxin may be exotoxin or endotoxin, or a mixture of both, and may be attenuated or completely converted into toxoid by suitable means, for example, chemical treatment. In preparing a composition of the invention from a whole bacterial culture type antigen, it is preferable to kill the bacteria in the bacterial culture vaccine either by heat or chemical means. The composition containing the whole bacterial culture type antigen incorporated into the bentonite upon injection into living beings causes certain reactions to take place as a result of which there appears in the blood stream of the animal immune bodies or antibodies.

While Example 2 serves to illustrate the application of the invention to a whole bacterial culture type antigen, such as blackleg whole culture, the invention is similarly applicable to other antigenic materials illustrated by other antigens of blackleg, such as the toxin, toxoid, natural and cultural aggressins, bacterin and toxoid bacterin.

Compositions similar to the type indicated by Example 2 may be employed to immunize man or animal against various other diseases.

While bentonite is described in the examples as the hydrophilic collod into which the antigenic material is incorporated, the invention is not restricted to its use, for other hydrophilic colloids including all bentonites may be employed as well as the certain fuller's earths which when treated with alkali are converted to hydrophilic colloids and exhibit properties similar to bentonite. The bentonites are clays composed of natural hydrous aluminum silicate and vary from one another in some cases by part of the aluminum being replaced by iron, calcium or magnesia, and to a small extent by the alkali metals, with the amount of fixed water varying from 1 to 15 molecules. Part of the metal cations present such as those of the alkaline earth metals may be exchanged by sodium or hydrogen, yielding the so-called sodium bentonite and hydrogen bentonite, or may be exchanged by cations of other electrolytes present in any disperison. All of these various types are included in the class known as bentonites which also comprises the polydisperse as well as the monodisperse fractions of bentonite. All of these hydrophilic colloids, including the class known as bentonites and the alkali-treated fuller's earths, are referred to in this specification and the appending claims as bentonite-like-behaving clays or as bentonite-like-behaving clays qualitatively resembling bentonite in adsorption While the invention has been illustrated by examples showing bentonite as the adjuvant employed in the composition to control the slow release of the antigenic material following injection, any of the bentonite-like-behaving clays may be employed in the same or other examples. At the same time the bentonite concentration, or the hydrophilic colloid concentration, in the original suspension into which the antigenic material is subsequently incorporated is not limited to 5% as employed in the examples. It is advantageous to employ a concentration of 5% of bentonite in the aqueous suspension to which the antigenic material is to be added since it is usually at a concentration just beyond 5% to 6% at which the bentonite suspensions begin to gel. Therefore, it is more convenient to use any fluid concentration up to around 5% to 6%, although a higher concentration may be used even though the bentonite suspension will gel, because the gel will become converted to a fluid upon the addition of the required volume of the antigenic material necessary to produce the ultimate antigenic composition of the desired degree of fluidity.

While the bentonite suspension itself may be prepared by merely agitating the desired amount of bentonite in water, in some cases it is helpful to run the suspension through an homogenizer before incorporating it in the antigenic material. This is particularly helpful in those cases in which globules of bentonite may have formed within the suspension, wherein merely the outer particles of bentonite are wetted by the water and the inner ones remain dry and are not initially homogeneously suspended.

The concentration of the bentonite-like-behaving clay in the ultimate antigenic composition is not restricted to about 0.83% as found in the examples. Any suitable concentration of the hydrophilic clay may be used in the final composition so long as the composition to be injected is not too viscous to prevent free flow of the composition through the usual hypodermic needle, i. e., that the suspension is fluid enough to pass through the usual hypodermic needle. In some cases the concentration of the hydrophilic clay in the final composition may be as low as 0.5% or even lower, although in many cases when the concentration is around 0.5% or lower, the clay may in part separate out of suspension and settle. Concentrations of 1%, 1½% and higher, of the clay in the final composition may be suitable in some cases, and are very stable and do not settle over a long time.

In the specific examples illustrating the invention, there has been shown the preparation of the compositions by the combination of the antigenic material with a bentonite suspension. It should be understood that the bentonite, or other hydrophilic colloid, need not necessarily be employed as an aqueous suspension in the preparation of the compositions, but may be added even in the form of a dry powder to the antigenic material in an amount sufficient to give the desired ultimate concentration of the hydrophilic colloid in the finished composition.

The effectiveness of the compositions of the invention following injection into living beings is due to the peculiar physical properties of the hydrophilic colloid used. The colloid does not interact chemically with the antigen or proteins associated with the antigen to form insoluble precipitates as in the case when calcium chloride and alum are used. Thus the possibility of side reactions is avoided. The bentonite-like clay binds the antigen by adsorption and probably also by absorption. The particle size is extremely small, 71% being less than 0.5 micron. This great degree of dispersion produces extensive free exposed surfaces which adsorb the antigen. Moreover, the sponge-like, lattice structure of the particles, permits the antigen to penetrate the interior surface. Due to the extremely fine dispersion of the bentonite particles, the compositions described do not cause distressing local reaction at the site of injection.

These compositions are extremely stable and their solid content does not settle out even over a long extended time. An injection of these new compositions in a smaller volume than is customarily employed is more rapid and more effective in antibody production than might ordinarily be expected.

While the invention has been described with respect to certain specific embodiments thereof, it is understood that modifications, alterations and combinations thereof may be made, all within the scope of the invention, limited only to the construction of the depending claims.

I claim:
1. An antigenic composition suitable for injection into living beings, comprising an antigen incorporated in an at least substantially completely colloidal clay of the class known as bentonites, suspended in an aqueous medium, said clay being present in a proportion below that which would prevent free flow of the suspension through the injection means.

2. An antigenic composition suitable for injection into living beings, comprising an antigen incorporated in bentonite suspended in an aqueous medium, the bentonite being present in a proportion below that which would prevent free flow of the suspension through the injection means.

3. An antigenic composition suitable for injection into living beings, comprising diphtheria toxoid incorporated in bentonite, suspended in an aqueous medium, the bentonite being present in a proportion below that which would prevent free flow of the suspension through the injection means.

4. An antigenic composition suitable for injection into living beings, comprising a blackleg antigen incorporated in bentonite, suspended in an aqueous medium, the bentonite being present in a proportion below that which would prevent free flow of the suspension through the injection means.

5. In the method of producing antibodies in living beings, the step which comprises injecting into the living being a composition comprising an antigen incorporated in a bentonite, suspended in an aqueous medium, the bentonite being present in a proportion below that which would prevent free flow of the suspension through the injection means.

6. An antigenic composition suitable for injection into living beings upon suspension in an aqueous medium to a consistency sufficient to permit free flow of the suspension through the injection means, said composition comprising an antigen incorporated in a hydrophilic colloid selected from the class consisting of a bentonite and an alkali-treated fuller's earth.

7. An antigenic composition suitable for injection into living beings, comprising, suspended in an aqueous medium, an antigen incorporated in a hydrophilic colloid selected from the class consisting of a bentonite and an alkali-treated fuller's earth, said colloid being present in a proportion below that which would prevent free flow of the suspension through the injection means.

8. An antigenic composition suitable for injection into living beings, comprising a toxoid incorporated in a hydrophilic colloid selected from the class consisting of a bentonite and an alkali-treated fuller's earth, suspended in an aqueous medium, said colloid being present in a proportion below that which would prevent free flow of the suspension through the injection means.

9. An antigenic composition suitable for injection into living beings, comprising diphtheria toxoid incorporated in a hydrophilic colloid selected from the class consisting of a bentonite and an alkali-treated fuller's earth, suspended in an aqueous medium, said colloid being present in a proportion below that which would prevent free flow of the suspension through the injection means.

10. An antigenic composition suitable for injection into living beings, comprising a whole bacterial culture type of antigenic substance incorporated in a hydrophilic colloid selected from the class consisting of a bentonite and an alkali-treated fuller's earth, suspended in an aqueous medium, said colloid being present in a proportion below that which would prevent free flow of the suspension through the injection means.

11. An antigenic composition suitable for injection into living beings, comprising a blackleg antigen incorporated in a hydrophilic colloid selected from the class consisting of a bentonite and an alkali-treated fuller's earth, suspended in an aqueous medium, said colloid being present in a proportion below that which would prevent free flow of the suspension through the injection means.

12. In the method of producing antibodies in living beings, the step which comprises injecting into the living being a composition comprising an antigen incorporated in a hydrophilic colloid selected from the class consisting of a bentonite and an alkali-treated fuller's earth, suspended in an aqueous medium, said colloid being present in a proportion below that which would prevent free flow of the suspension through the injection means.

PETER MASUCCI.